United States Patent
Rule et al.

(10) Patent No.: US 8,221,533 B2
(45) Date of Patent: Jul. 17, 2012

(54) METHOD TO RENDER SURFACES WATER REPELLENT

(75) Inventors: Mark Rule, Roswell, GA (US); Harry Harshaw, Marietta, GA (US)

(73) Assignee: H20 Barrier Technologies LLC, Marietta, GA (US)

(*) Notice: Subject to any disclaimer, the term of this patent is extended or adjusted under 35 U.S.C. 154(b) by 0 days.

(21) Appl. No.: 13/177,035

(22) Filed: Jul. 6, 2011

(65) Prior Publication Data
US 2012/0017801 A1    Jan. 26, 2012

Related U.S. Application Data

(60) Provisional application No. 61/365,975, filed on Jul. 20, 2010.

(51) Int. Cl.
| | |
|---|---|
| *C04B 41/46* | (2006.01) |
| *C04B 41/47* | (2006.01) |
| *C04B 103/65* | (2006.01) |
| *C09D 5/00* | (2006.01) |
| *C09K 3/18* | (2006.01) |

(52) U.S. Cl. ............ 106/2; 106/717; 106/806; 106/810; 106/817; 427/379; 427/384; 428/688

(58) Field of Classification Search ................ 106/717, 106/806, 810, 817, 2; 427/379, 384; 428/688
See application file for complete search history.

(56) References Cited

U.S. PATENT DOCUMENTS

| | | | | |
|---|---|---|---|---|
| 3,794,506 | A * | 2/1974 | Schmidt et al. | 106/717 |
| 5,124,289 | A * | 6/1992 | Martin et al. | 502/4 |
| 2007/0036973 | A1 * | 2/2007 | Bruner et al. | 428/364 |
| 2007/0092640 | A1 * | 4/2007 | Bruner et al. | 427/157 |

* cited by examiner

*Primary Examiner* — Anthony J Green
(74) *Attorney, Agent, or Firm* — Fraser Clemens Martin & Miller LLC; J. Douglas Miller

(57) ABSTRACT

A method to render stone, ceramic, or cementitious structures water repellent is disclosed. The method includes the step of contacting the stone, ceramic, or cementitious structures with an alkylphosphonic acid. The alkylphosphonic acid can be dispersed in an aqueous medium and can be at least partially neutralized with ammonia, an amine, or a basic alkali salt.

11 Claims, 2 Drawing Sheets

METHOD TO RENDER SURFACES WATER REPELLENT

CROSS-REFERENCE TO RELATED APPLICATION

This application claims the benefit of U.S. Provisional Patent Application Ser. No. 61/365,975 filed on Jul. 20, 2010, hereby incorporated herein by reference in its entirety.

FIELD OF THE INVENTION

This invention relates to a method to render stone, ceramic, and cementitious surfaces and structures water repellent by application or incorporation of at least one alkylphosphonic acid, either alone or co-mixed with low to medium molecular weight paraffinic liquids or solids.

BACKGROUND OF THE INVENTION

Granite, marble, slate, ceramic, brick, and porcelain surfaces represent a large amount of floor and wall area in both residential and commercial buildings, with over 2 billion square feet installed in the United States each year. These products are often selected for use in areas which will see exposure to liquid water on a regular basis, such as in kitchens, baths, and exterior structures. Almost without exception, these surfaces are installed by adhering pre-cut tiles or stones to a wall or floor, with the spacing between the pieces subsequently filled with a cementitious matrix, commonly known as mortar or grout. Depending on the material, the tiles or stones themselves exhibit varying degrees of water porosity, ranging from relatively impervious in the case of porcelain tile to extremely porous in the case of marble. Regardless, almost without exception the grouting material is highly porous to liquid water.

Granite, marble, slate, sandstone, limestone, and other materials can generally be regarded as stones. These materials are mined, cut to a desired shape, and optionally may be polished or tumbled to achieve a specific surface appearance. Ceramics, porcelain, and bricks can generally be regarded as ceramic compositions formed by combining powdered precursors in specific ratios followed by heating to high temperatures to fuse the component grains together and form a final shape. Grout, mortar, cement, and concrete can generally be regarded as cementitious materials formed by combining powdered precursors with other additives (such as sand, gravel, etc.) and water. On contact with water, chemical reactions occur to cause the overall composition to harden, or cure, into a final composition.

Cementitious materials themselves may be characterized as hydraulic or non-hydraulic. Hydraulic cements are able to withstand immersion in water without short-term loss of strength. Examples of hydraulic cements include Portland and Rosendale cements. Non-hydraulic cements must remain dry to retain their strength. Examples of non-hydraulic cements include gypsum and Plaster of Paris.

In addition to use in conjunction with ceramic and stone surfaces, cementitious materials, especially hydraulic cements, are widely used in structural applications, including roads, bridges, foundations, and buildings. In these applications, concrete (a composite of cement and aggregate) is a dominant material. In many of these applications exposure to liquid water is both frequent and undesirable, due to the impact on the structural strength of the cementitious material itself and on reinforcing additives, especially steel.

As a consequence of the porous nature of these products and the environments they are installed in, liquid water often penetrates beneath the surface of these materials. Such liquid penetration is highly undesirable, since in the enclosed spaces rot, mildew growth, and degradation of the supporting substrates can occur. In addition, cementitious and other relatively porous materials can retain sufficient moisture such that they promote mold growth. In order to address this problem, a number of products have been developed. These products typically consist of an organic or semi-aqueous dispersion of a silicone or fluoroacrylic copolymer, which are applied after construction is complete, and on evaporation of the solvent deposits a water repellent polymer film on the tile and cementitious surfaces.

While these products exhibit varying degrees of efficacy in this function, they all possess a number of drawbacks. These include: the use of organic solvents or co-solvents, the need for a contiguous film after application, and the relatively non-specific nature of adhesion of the coating material. Thus, the use of organic solvents or co-solvents increases the difficulty and health risk associated with application of these products. The need for a contiguous film means water penetration can occur if there are breaks in the film surface. These breaks can occur due to incomplete application or due to abrasion and wear/tear on the surface film over time. The relatively non-specific nature of the adhesion means that considerable care must be taken during application in order to keep the coating material off of untargeted surfaces. Finally, because these products deposit a polymeric film, the thickness of the film is a function of the application process. Insufficient application will result in films that are too thin and/or non-contiguous, while excessive application will result in films that are greater than the desired thickness. Such thick films often exhibit haze, surface mottling, and other cosmetically unattractive features.

SUMMARY OF THE INVENTION

Concordant and congruous with the present invention, a method of rendering stone, ceramic, and cementitious surfaces and structures water repellent has surprisingly been discovered.

The present invention discloses a method to render stone, ceramic, and cementitious surfaces and structures water repellent that avoids the drawbacks of prior-art methods and products. In particular, the method of the present invention consists of contacting these surfaces and structures with an aqueous dispersion or solution of an alkylphosphonic acid or salt, either alone or in combination with a paraffinic liquid or solid. The alkylphosphonic acids react with divalent, trivalent, and tetravalent ions that comprise these substances, forming an insoluble, hydrophobic molecular layer on the surface of the grains composing the surface and structure of these materials. For purposes of this application, water repellency is defined as having a substantially reduced tendency to absorb liquid water. Simple tests for water repellency include liquid water contact angle measurement and liquid water weight gain/loss measurements.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
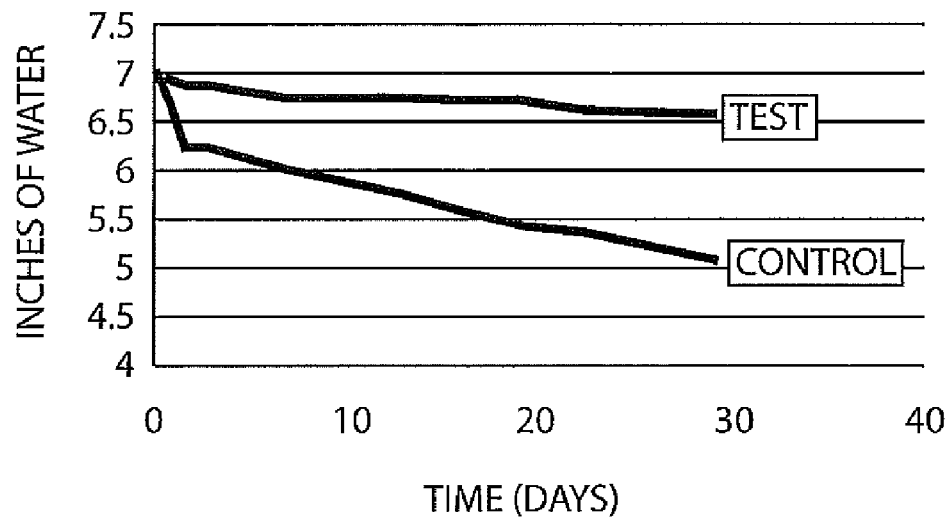
FIG. 1 is a graphical representation of a water permeation test showing a change in water height over time.

The following detailed description and appended drawings describe and illustrate various exemplary embodiments of the invention. The description and drawings serve to enable one skilled in the art to make and use the invention, and are not intended to limit the scope of the invention in any manner. In respect of the method and compositions disclosed, the steps presented are exemplary in nature, and thus, the order of the steps is not necessary or critical.

Phosphonic acids can be characterized as having the general formula:

$R-PO_3H_2$, where R— is a hydrocarbon fragment and the compound possesses a carbon-phosphorus bond. The hydrocarbon fragment R— may be comprised of alkyl, cycloalkyl, or aryl moieties, and may be optionally substituted with other functional groups including but not limited to hydroxyl, carboxyl, chloro, bromo, fluoro, or amino.

Phosphonic acids possess a number of useful characteristics than find utility in the present invention. First, they can be readily synthesized from commonly available chemicals. Second, the $-PO_3^{-2}$ portion of the molecule is highly water soluble if in the free acid form or as a monovalent salt. Third, the $-PO_3^{-2}$ portion reacts rapidly at room temperature with divalent, trivalent, and tetravalent ions, oxides, carbonates, and other salts to form water insoluble products. Fourth, the phosphorus-carbon bond that links the inorganic $-PO_3^{-2}$ portion of the molecule to the organic portion is chemically, thermally, and photochemically stable. Fifth, if the organic portion of the phosphonic acid comprises linear alkyl chains, on reaction of the $-PO_3^{-2}$ moiety with a surface comprising divalent, trivalent, or tetravalent ions the alkyl chains spontaneously align to form a dense contiguous surface. Because the alkyl chains are themselves hydrophobic, the exposed surface is consequently rendered hydrophobic. Seventh, because the resulting alkylphosphonate divalent, trivalent, and tetravalent salts are insoluble and thermodynamically very stable, they cannot be removed by treatment with common cleaning materials, including mild acids and bases (for example, ammonia, vinegar, bleach, sodium bicarbonate, etc.). Eighth, because the phosphonic acids have little or no tendency to react with materials that are not substantially comprised of divalent, trivalent, or tetravalent ions, there is little or no tendency to adhere to other surfaces, such as wood or plastic. Ninth, because the mechanism of action is reaction with surface ions, the resulting modified surface has little or no tendency to react further with additional phosphonic acid; hence repeated applications will not result in increasing thickness of the residue. Tenth, because phosphonic acids are not polymeric and the method of application does not result in the formation of a polymeric film, removal and disposal of excess product is straightforward. Typically, disposal can be accomplished simply by pouring the excess product and any rinse water down a drain. Because phosphonic acids bind tightly to divalent, trivalent, and tetravalent ions, any material that makes its way into the soil will react with these ions and be rendered non-leachable. Likewise, any material disposed into a waste sewer will be removed during normal processing in a wastewater facility, where filtering with Fuller's Earth or treatment with alum is almost universally practiced. Eleventh, the alkyl phosphonic acids preferred in the present invention themselves possess a low order of toxicity and have no known biocidal or herbicidal properties. Twelfth, the alkylphosphonic acids of the present invention are non-volatile, water dispersible and only mildly acidic, hence do not represent a breathing or contact hazard during application.

The efficacy of phosphonic acids in bonding to stone, ceramic, and cementitious surfaces and structures is a direct consequence of the chemical composition of these materials and the ions on the surface of the grains that comprise them. For example, marble is comprised predominantly of calcium carbonate. Slate is comprised primarily of compressed clay, which in turn is comprised of aluminosilicates. Granite is also comprised primarily of aluminosilicates. Ceramic tile is comprised of aluminates and aluminosilicates. Portland cement, which is the basic material used in grout, is comprised of calcium and magnesium hydroxides and aluminosilicates.

While all phosphonic acids possess the ability to react with divalent, trivalent, and tetravalent ions, the phosphonic acids of present invention are alkyl phosphonic acids, and preferably linear alkyl phosphonic acids, wherein the alkyl group does not possess any functional group that would render it hydrophilic. Alkyl phosphonic acids of the present invention possess both the desired hydrophobicity imparted by the alkyl portion of the molecule and a tendency to form a densely packed surface. The tendency to form a densely packed surface is driven by Van der Waals attraction between the $-CH_2-$ groups in the alkyl chain. The effect of alkyl chain length on the tendency to form a densely packed surface can be readily seen in the effect of alkylphosphonic acid chain length on water contact angles.

Water contact angle measurement is a simple, direct way of determining the hydrophilicity or hydrophobicity of a surface. Very hydrophilic surfaces possess low water contact angles, typically between 0 and 20 degrees. Highly hydrophobic surfaces possess very high water contact angles, typically greater than about 100 degrees. For an alumina surface treated with aqueous solutions of alkylphosphonic acids containing 1, 2, 4, 8, 10 and 18 carbons, the water contact angles are approximately 40, 50, 90, 120, 120, and 120 degrees. An untreated alumina surface itself had a water contact angle less than about 20 degrees. Thus in the present invention linear alkyl phosphonic acids with more than six carbons are preferred.

Conversely, as the length of the linear alkyl chain increases the melting point of the alkylphosphonic acid increases and its water dispersibility decreases. Thus butylphosphonic acid is readily soluble in water, while laurylphosphonic acid is only dispersed with difficulty. Because of the decreasing water dispersibilty with chain length, in the present invention octylphosphonic acid is especially preferred, since it provides equal hydrophobicity to longer chain alkylphosphonic acids, yet disperses readily in water.

The amount of alkylphosphonic acid dispersed in water is not especially critical. However, while amounts greater than 10 wt % can be readily dispersed in water, such dispersions deliver more alkylphosphonic acid than is generally necessary. Conversely, dispersions containing less than about 0.1 wt % alkylphosphonic acid may deliver less alkylphosphonic acid than is sufficient. In a preferred embodiment, an aqueous dispersion comprising about 0.2-5 wt % octylphosphonic acid in water is applied at room temperature to the surface or structure to be treated.

The amount applied or the specific method of application is not critical. Application can for example be by spraying, dipping, pouring onto the surface, or wiping on with an absorbent sponge or cloth. After application, the water is allowed to evaporate. In some instances a second application may be required, especially when the surface is highly porous and/or insufficient phosphonic acid was available to react with all the surface metal ions. While not critical to the efficacy of this invention, the treated surface may optionally be heated to speed evaporation of water. To test for effectiveness of the surface treatment, a drop of water can be applied to the treated surface. On well-treated surfaces the water drop will remain on the surface and not spread out over time.

In another embodiment, an alkylphosphonic acid dispersion is mixed with a powdered cementitious material which is then formed into a final shape and allowed to cure. After curing, the resulting cementitious material is rendered water repellent throughout the structure.

While for reasons of cost and ease of application water is a preferred medium for dispersion, the practice of this invention does not depend on dispersion in water. Any other medium including but not limited to ethanol, isopropanol, mineral spirits, acetone, and methyl ethyl ketone is suitable. Direct application of concentrated or molten alkylphosphonic acids is also suitable.

While treatment of stone, ceramic, and cementitious surfaces by the method of the present invention renders these surfaces and structures water repellent, in general there is little or no change in the appearance of the surface. However, in some instances it is desirable to alter the appearance of a surface, such as by giving it a greater sheen. In these instances application of a dispersion of alkylphosphonic acid in water containing optionally 1-30% paraffinic liquid or solid dispersions is preferred. Because the alkylphosphonic acid acts as a surfactant in water, it will assist in the dispersion of the paraffin to form a stable emulsion. On application to the stone, ceramic, or cementitious surface the binding of the octylphosphonic acid will be unimpeded, but after reaction with the alkylphosphonic acid to form a hydrophobic surface, the paraffinic dispersion will adhere to the hydrophobic surface. Unlike the mono-molecular alkylphosphonate layer, the paraffin will form a relatively thick layer that can visibly alter the appearance of the surface.

In yet another embodiment, aromas such a lemon oil, orange oil, or other aromas may be added to the water dispersion to enhance the aroma during application and drying. Because 2 wt % alkylphosphonic acid is about as acidic as lemon juice, these aromas are stable in the product.

In yet another embodiment, where even the mild acidity of the alkylphosphonic acid is not preferred, the alkylphosphonic acid may be partially neutralized with an amine such as ammonia, ethanolamine, diethanolamine, etc. or a basic alkali salt such as for example sodium hydroxide, sodium bicarbonate, potassium acetate, etc. Such partial neutralization does not affect the hydrophobicity of the resulting treated surface or structure. Partial neutralization also enhances the water dispersibility of the alkylphosphonic acid, and may be preferred where longer chain alkylphosphonic acids are selected.

When applied to cementitious surfaces, occasionally a surface haze can be formed. However, unlike surface haze formed by other products, removal of the surface haze can be readily accomplished by a second application of the alkylphosphonic acid dispersion or common sultanate detergents, followed by wiping of the surface to remove the released haze.

While the actual hydrophobic surface on the grains is literally only one molecule thick, it is highly effective in repelling water. Moreover, because a polymeric film is not being applied, hydrophobicity can extend well below the physical surface of the substrate. Consequently, even if the surface is highly abraded by wear the underlying grains of material can retain water repellency.

EXAMPLES

The following examples demonstrate the practice of this invention. Concentrations are all expressed as weight percent unless otherwise noted.

Example 1

One half of the surface of a 4 inch square, ⅜" thick marble travertine tile was wiped on its top surface only with a dispersion of 10% octylphosphonic acid in water and allowed to air dry. After drying, a drop of water was placed on each the treated and untreated halves. On the untreated half the drop immediately wet the surface of the tile and was rapidly absorbed into the tile. On the treated half, the drop of water formed a bead that did not absorb with time. The tile was then turned over and droplets of water were applied to the back surface. The same water bead formation was observed on the back of the tile opposite of the treated area. This shows the method of the present invention is effective not only at providing a hydrophobic surface, but that the hydrophobicity can extend below and even through the substrate.

Example 2

A ceramic tile counter with ¼" wide black grout lines was tested for water repellency. A drop of water was place on the grout line. The water drop immediately absorbed into the grout and spread until over 1 inch of grout was wetted. Next a 2 wt % dispersion of octylphosphonic acid in water was applied by flooding the grout surface. After this application had dried for about 30 minutes, the surface was treated again and was wiped lightly with a paper towel. After drying, the appearance of the treated and adjacent untreated grout was identical. Likewise, there was no change in the appearance of the treated tile adjacent to the treated grout. Application of a drop of water to the treated grout resulted in a bead of water that did not absorb or spread into the grout.

Example 3

In a glass aquarium tank was fitted a piece of gypsum board to which a marble travertine tile surface grouted with black grout had been adhered. The tile/gypsum board assembly was then sealed to the walls and floor of the tank with silicone caulking. Next, the exposed surface of the tile and grout was treated with 2 wt % octylphosphonic acid in water into which was dispersed 4 wt % mineral oil. After drying and application of a second treatment, the treated surface was allowed to dry for approximately 4 hours. Next, water to a depth of 8 inches was placed in the aquarium contacting the treated side of the tile. After eight hours there was no evidence of penetration of water into the tile surface, and the gypsum board remained dry with no evidence of moisture absorption.

Example 4

Example 3 was repeated, but using a slate tile. Again there was no evidence of water penetration after eight hours of submersion.

Example 5

The cut, unpolished edge of a granite block was tested for water repellency. Application of a drop of water resulted in its rapid absorption. The surface was then treated with 2 wt % octylphosphonic acid in water. After drying the surface was retested. It was observed that the water droplet again absorbed, but at a slower rate. After two more applications with drying between applications an applied water droplet remained on the surface with no evidence of absorbing.

Example 6

A section of the treated tile surface from Example 1 was rubbed vigorously for 30 seconds with 0000 steel wool. The abraded surface was then rinsed with water and allowed to air dry. After drying, a droplet of water was applied to the abraded surface. The water contact angle of the droplet was identical to the angle observed for a similar droplet placed on a portion of the treated tile surface that had not been abraded.

Example 7

A section of the treated tile surface from Example 1 was rubbed vigorously for 30 seconds with a paper towel soaked in 3 wt % ammonia water. The rubbed surface was then rinsed with water and allowed to air dry. After drying, a droplet of water was applied to the rubbed surface. The water contact angle of this droplet was identical to the angle observed for a similar droplet placed on a portion of the treated tile surface that had not been rubbed.

Example 8

A section of the treated tile surface from Example 1 was rubbed vigorously for 30 seconds with a paper towel soaked in 5 wt % acetic acid/water solution. The rubbed surface was then rinsed with water and allowed to air dry. After drying, a droplet of water was applied to the rubbed surface. The water contact angle of this droplet was identical to the angle observed for a similar droplet placed on a portion of the treated tile surface that had not been rubbed.

Example 9

A section of the treated tile surface from Example 1 was rubbed vigorously for 30 seconds with a paper towel soaked in water containing a liquid detergent. The rubbed surface was then rinsed with water and allowed to air dry. After drying, a droplet of water was applied to the rubbed surface. The water contact angle of this droplet was identical to the angle observed for a similar droplet placed on a portion of the treated tile surface that had not been so rubbed.

Example 10

A 1 pound sample of powdered, sanded grout mix was blended with 80 grams of a 4% solution of octylphosphonic acid ethanolamine salt. For comparison, a separate 1 pound sample of powdered, sanded grout mix was blended with 80 grams of tap water. Both were poured into separate molds and allowed to cure. After 72 hours each was tested for water repellency. Water placed on the surface of the treated grout formed beads of water, whereas water placed on the surface of the untreated grout was rapidly absorbed.

Example 11

A solution of 2% octylphosphonic acid ethanolamine salt containing 15% of a paraffin wax emulsion was coated onto one half of a dark gray slate tile. After drying, the treated surface exhibited enhanced gloss as well as exceptional water repellency.

Example 12

The base of two concrete containers 10 inches square and 8 inches deep were sealed with Portland cement. The inside surfaces of one container was treated twice with a 2% solution of octylphosphonic acid ethanolamine salt. Both were then filled to a depth of 7.0 inches with tap water and the top surface covered with a polyethylene film (to prevent evaporation from the open top of the containers). The water height was monitored over time. The change in water height is illustrated in FIG. 1.

This figure illustrates that: a) there is essentially no initial absorption of water in the treated container, as evidenced by the lack of an initial rapid drop in water level in the Test as compared to the Control; b) the longer term rate of water loss from the Control container is consistent with both permeation of liquid water and transport of water vapor through the porous structure; and c) the very slow rate of water loss from the Test container is consistent with transport of water vapor (but not liquid water) through the treated surface.

Example 13

Figure 2:
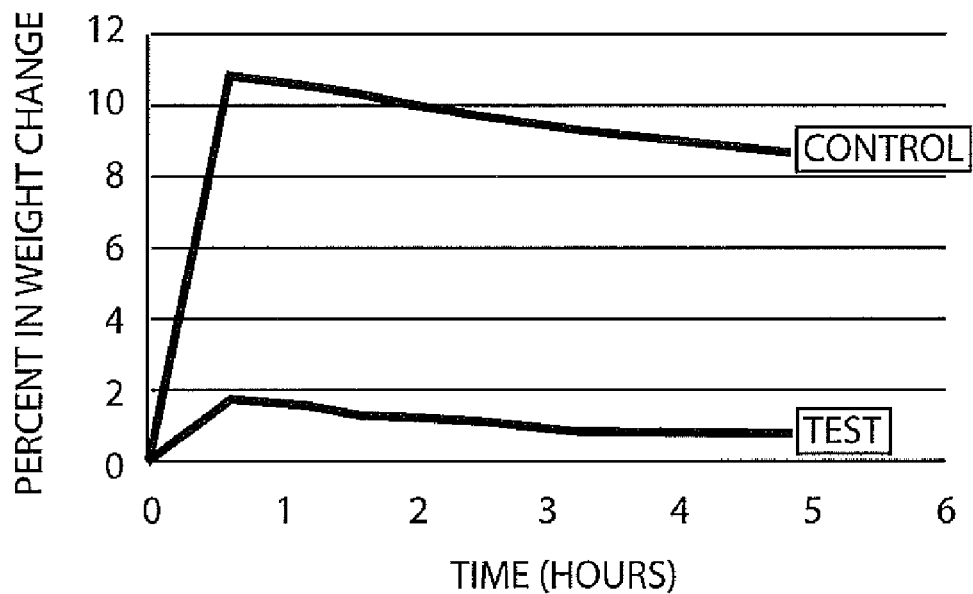
FIG. 2 is a graphical representation of a moisture sorption/loss sanded grout showing a percent weight change over time.

Two grout samples measuring 6 inches square and ½ inch thick were prepared from 454 grams of a commercial sanded grout mix using either 90 grams of water (Control) or 90 grams of a 4% solution of octylphosphonic acid ethanolamine salt in water (Test). After curing for 72 hours, the two samples were dried at 200 deg F. for 4 hours followed by equilibration at 72 deg F. at 57% RH for 18 hours. After weighing, the samples were immersed in water for 30 minutes. After removal from the water, the samples were wiped dry of surface moisture and weighed again. The Control sample exhibited a 10.76% weight gain, whereas the Test sample exhibited only a 1.79% weight gain. The samples were then allowed to equilibrate in air at room temperature and 57% RH and the percent weight change (relative to the starting weight) of each sample was followed over time. These results are summarized in FIG. 2.

It is evident from this example that grout prepared according to the method of this invention not only absorbs far less liquid water than a comparison grout, but it also does not exhibit any tendency to retain moisture.

Example 14

A 1 lb sample of gypsum-based powdered joint compound was mixed with water containing 2% octylphosphonic acid ethanolamine salt according to the manufacturer's directions. For comparison, a second 1 lb sample of the same powdered gypsum was mixed with an equal amount of water. Both samples were poured into 2" diameter cardboard tubes and allowed to set. After setting, the tubes were removed and discs cut from the center of the tubes. Water droplets were placed onto the center of the example and comparison discs. On discs prepared using water containing 2% octylphosphonic acid ethanolamine salt the water droplets beaded up and did not absorb into the gypsum. On comparison discs, the water droplets were rapidly absorbed.

Example 15

One pound samples of powdered cement mix were blended with 90 grams of water containing either 0, 1, 2, and 4% octylphosphonic acid ethanolamine salt. After blending, each sample was divided into three portions and were placed in PVC tubes 1.5" in diameter and 1.5" tall. Each was allowed to cure for 72 hours. After curing, the PVC tubes were removed and the cement samples allowed to cure for an additional 4 days. A total of 12 samples were thus prepared, with three replicates for each. After curing, the three control samples (0% octylphosphonic acid ethanolamine salt) weighed on average 98.2 (+/−2.6) grams. The nine test samples weighed on average 89.0 (+/−3.4) grams. Thus, the test samples were 9.3% less dense than the control samples.

Figure 3:
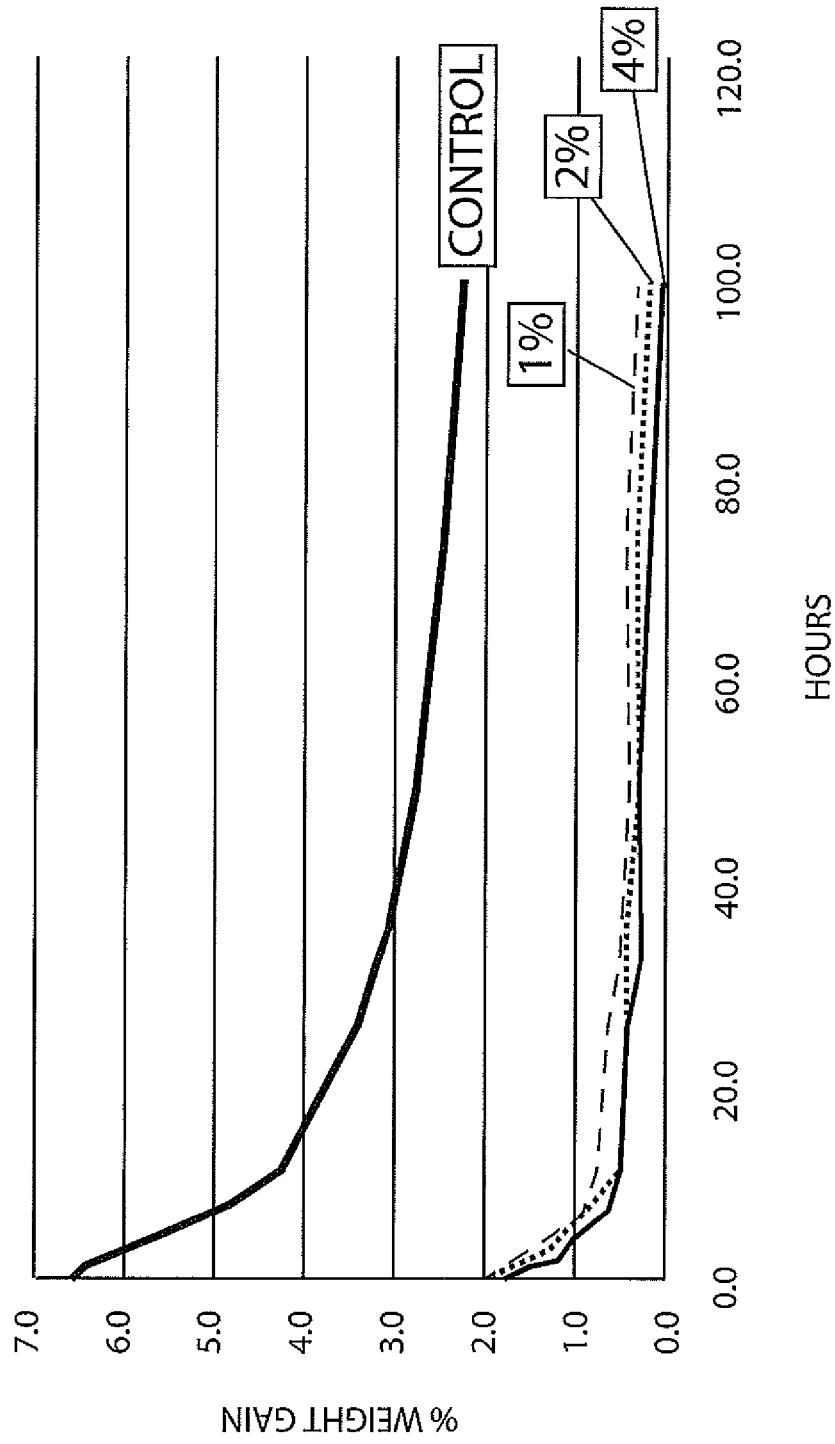
FIG. 3 is a graphical representation of a cement weight change after 42 hour water immersion.

One cylinder from each variable (control, 1, 2, and 4% octylphosphonic acid ethanolamine salt) were weighed and then immersed in room temperature water for 42 hours. They were then removed and wiped of surface moisture. The weight of each was immediately recorded and the % weight gain calculated based on the initial weight before immersion. The cylinders were next allowed to stand at room temperature (72° F. at 57% relative humidity) and the weight change recorded over a period of 100 hours. As can be seen from FIG. 3, all of the test variables absorbed ~70% less water, and all lost weight at the same or faster rate than the control sample.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in the specification (including any accompanying claims, abstract and drawings), or the any novel one, or any novel combination, of the compositions or steps of any method or process so disclosed.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method to render stone or hardened cementitious structures water repellent that comprises contacting said structures with a composition comprising an alkylphosphonic acid.

2. The method of claim 1, wherein the alkylphosphonic acid is dispersed in an aqueous medium.

3. The method of claim 1, wherein the alkylphosphonic acid is at least partially neutralized with ammonia, an amine, or a basic alkali salt.

4. The method of claim 1, wherein the alkylphosphonic acid is a linear alkylphosphonic acid.

5. The method of claim 4, wherein the linear alkylphosphonic acid comprises octylphosphonic acid.

6. The method of claim 2, wherein the aqueous medium further comprises a paraffinic liquid or an aqueous dispersion of a solid paraffin.

7. A method to render stone or hardened cementitious surfaces and structures water repellent that comprises the steps of a) contacting said surface or structure with a solution comprising octylphosphonic acid and b) allowing the solvent to evaporate.

8. The method of claim 7, wherein steps a) and b) are repeated a plurality of times.

9. A method to render cementitious structures water repellent that comprises a) contacting a powdered cementitious precursor with a composition comprising an ammonium or amine salt of an alkylphosphonic acid, and b) allowing the resulting composition to harden.

10. A water repellent article comprising a stone or hardened cementitious material contacted with an alkylphosphonic acid.

11. A method to render stone or hardened cementitious materials water repellent that comprises contacting said materials with an aqueous dispersion comprising an octylphosphonic acid salt.

* * * * *